(12) United States Patent
Kimura et al.

(10) Patent No.: US 6,995,491 B2
(45) Date of Patent: Feb. 7, 2006

(54) INSULATING PAPER PIECE FOR ELECTRIC MOTORS AND ELECTRIC MOTOR

(75) Inventors: Hideaki Kimura, Anjo (JP); Tooru Kuroyanagi, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 5 days.

(21) Appl. No.: 10/781,674

(22) Filed: Feb. 20, 2004

(65) Prior Publication Data

US 2004/0183391 A1 Sep. 23, 2004

(30) Foreign Application Priority Data

Mar. 20, 2003 (JP) ............................. 2003-078641

(51) Int. Cl.
*H02K 3/34* (2006.01)
(52) U.S. Cl. ....................................................... 310/215
(58) Field of Classification Search ................ 310/179, 310/180, 215
See application file for complete search history.

(56) References Cited

U.S. PATENT DOCUMENTS

| | | | |
|---|---|---|---|
| 3,315,105 A | * | 4/1967 | Moore, Jr. .................. 310/211 |
| 5,698,923 A | * | 12/1997 | Scherzinger et al. ........ 310/194 |
| 5,763,978 A | * | 6/1998 | Uchida et al. ............... 310/215 |
| 6,580,193 B2 | * | 6/2003 | Yoshikawa et al. .......... 310/215 |

FOREIGN PATENT DOCUMENTS

| JP | A 5-292693 | 11/1993 |
|---|---|---|
| JP | A 11-266557 | 9/1999 |

* cited by examiner

*Primary Examiner*—Tran Nguyen
(74) *Attorney, Agent, or Firm*—Oliff & Berridge, PLC

(57) ABSTRACT

An insulating paper piece for electric motors, capable of improving both electrical insulation between a coil and a stator core and electrical insulation between ends of coils of different phases without adversely affecting ease of coil insertion or the space taken up for the coil. A single insulating paper piece for electric motors contains at least two slot cell portions arranged in two slots of the stator core in which portions of one single pole coil are to be inserted, with two phase insulation portions arranged to connect respective ends of the two slot cell portions to form loops and disposed to face directly against coil ends of the single pole coil. The phase insulation portions comprise overlapping widthwise portions extended from both ends so that when a plurality of the insulating paper pieces for electric motors are mounted on the stator core, the respective overlapping portions of the adjacent insulating paper pieces overlap one another.

21 Claims, 13 Drawing Sheets

INSULATING PAPER PIECE FOR ELECTRIC MOTORS AND ELECTRIC MOTOR

This application claims priority from JP 2003-078641, filed Mar. 20, 2003, and the disclosure thereof is incorporated herein by reference.

BACKGROUND OF THE INVENTION

1. Field of Invention

The invention relates to an insulating paper piece for electric motors, for improving electrical insulation in those portions of an electric motor of a distributed winding structure where single pole coils are disposed adjacently, and an electric motor making use of the same to improve electrical insulation.

2. Description of Related Art

Electric motors of a distributed winding structure are included as a type of electric motor. They are structured so that when a plurality of single pole coils belonging to a group of coils of a plurality of phases are arranged on a stator core, a part of the coil ends projecting from both end surfaces of the stator core are arranged such that the ends of the coils of one phase and ends of the coils of another phase overlap one another.

Here, a single pole coil means one unit coil constituted by winding an electric wire a plurality of times in a manner to form one loop. Groups of coils of different phases can each be constituted by electrically connecting a plurality of such single pole coils to one another. Hereinbelow, a "single pole coil" referred to in the specification of the application has the same meaning as described above.

Such electric motors, of a distributed winding structure, need to have electrical insulation between insert portions of the respective single pole coils to be inserted in slots of a stator core and the stator core, and also need to have electrical insulation between coil end portions which have different phases, that is, phase insulation.

Conventionally, for example, as found in JP-A-11-266557, electrical insulation between a single pole coil 8 and a stator core 5 is achieved by mounting slot insulation paper pieces 91 (FIG. 15), which are bent to have a substantially U-shaped cross section so as to extend along inner wall surfaces 51 of the slots 50 as shown in FIGS. 15 and 16.

Also, provided on the slot insulation paper piece 91 are cuff portions 915, which protrude from the slots 50 to be folded toward an end surface of the stator core 5, to ensure a spacing between the coil ends 82 and the end surface of the stator core 5, that is, a so-called creeping distance. As noted, JP-A-11-266557 shows a conventional slot insulation paper piece.

Also, as shown in FIGS. 17 and 18, phase insulation is achieved by interposing strips of phase insulation paper 92 (FIG. 17) between U-phase and V-phase and between V-phase and W-phase, in the case where, for example, respective coil ends 82 of a single pole coil 8 (U) of U-phase, a single pole coil 8 (V) of V-phase, and a single pole coil 8 (W) of W-phase partially overlap one another. In addition, JP-A-5-292693 proposes a structure in which a pair of phase insulation paper 92 pieces disposed on both surfaces of a stator core are connected to each other by means of bands or strips between edges of each insulation paper 92 of the pair.

SUMMARY OF THE INVENTION

However, the insulation structure produced by the conventional slot insulation paper piece and the phase insulation paper piece described above involves the following problems.

A combination of the slot insulation paper piece and the phase insulation paper piece occasionally generates a gap between the two, and it is difficult to improve insulation of the coils facing the gap. Also, at the time of carrying out the process of fixing a plurality of coil ends to a predetermined configuration so as to prevent loosening and the process of trimming the shape of coil ends, the phase insulation paper piece is liable to become offset in position, so that a stable phase insulation cannot be achieved in some cases. In addition, measures for preventing positional offset of a phase insulation paper piece include a method of connecting phase insulation paper pieces together by means of a string as disclosed in, such as, JP-A-5-292693, but it is necessary in this method to receive the string in slots of a stator core, which obstructs insertion of a coil and causes a reduction in space.

The invention, at least, addresses these problems with conventional art electric motors. The invention provides an insulating paper piece for electric motors, capable of improving both electrical insulation between a coil and a stator core and electrical insulation between ends of coils of different phases, and includes an electric motor making use of the same.

An embodiment of the invention provides an insulating paper piece for electric motors by which electrical insulation in areas where single pole coils arranged on a stator core are adjacent is heightened, a single insulating paper piece containing at least two slot cell portions arranged in two slots of the stator core in which two portions of one single pole coil are received, and two phase insulation portions arranged to connect respective ends of the two slot cell portions to form loops and disposed to face coil ends of the single pole coil.

As described above, one insulating paper piece for electric motors, according to the invention, contains two slot cell portions for the slots, into which at least one single pole coil is inserted, and two phase insulation portions arranged to connect the slot cell portions together. The slot cell portions serve as insulating paper to electrically insulate slot inner-peripheral surfaces of the stator core from the single pole coil. Therefore, in the case where the electric motor insulating paper piece is mounted in the slots of the stator core and the single pole coil is mounted on the stator core, the two inserted portions of the single pole coil can be surrounded by the two slot cell portions and the entire lengths of the coil ends connecting the two inserted portions to each other can be caused to face directly against the phase insulation portions. Also, unification of the slot cell portions and the phase insulation portions makes it possible to inhibit deterioration of the configuration where the phase insulation portions face the coil ends. Therefore, it is possible to surely improve electrical insulation between the ends of coils of different phases by arranging the phase insulation portions therebetween, as well as electrical insulation between the single pole coil and the stator core.

Also, the two phase insulation portions are connected to each other through the slot cell portions. Therefore, it is not necessary to insert parts in addition to the slot cell portions into the slots of the stator core, so that degradation in quality of coil insertion and reduction in the space factor is not caused.

Accordingly, the invention can provide an insulating paper piece for electric motors, capable of improving both electrical insulation between a coil and a stator core and electrical insulation between the ends of coils of different phases without adversely affecting ease of coil insertion and space.

As a result, an electric motor of a distributed winding structure comprising a plurality of single pole coils arranged on a stator core, wherein those portions of coil ends of the single pole coils which protrude from both end surfaces of the stator core are arranged so that portions of coils of different phases overlap one another, and insulating paper pieces for electric motors arranged on the stator core to heighten electrical insulation in areas where the single pole coils adjoin, wherein at least a part of the insulating paper pieces for electric motors is composed of the insulating paper pieces for electric motors as described above, and comprising at least two slot cell portions arranged in two slots of the stator core in which two portions of one single pole coil are received and two phase insulation portions arranged to connect respective ends of those two slot cell portions to form integrated loops, the phase insulation portions disposed to face coil ends of the single pole coil, and the phase insulation portions are arranged between the adjacent ends of coils of different phases can be obtained.

An electric motor according to the invention uses an insulating paper piece for electric motors, as at least a part of insulating paper pieces for electric motors. Therefore, a structure can be adopted, in which both electrical insulation between a coil and a stator core and electrical insulation between ends of coils of different phases are improved without adversely affecting ease of coil insertion and space. Therefore, the electric motor according to the invention becomes excellent in energy efficiency and high in performance.

Various materials, including a sheet-shaped material having an electrical insulating property, can be applied as an insulating paper piece for the electric motors. For example, a composite sheet of three-layered structure, in which two heat-resistant sheets made of, for example, polyamide resin, and so on are joined together by an adhesive, can be used. More specifically, as an example, a three-layered composite sheet composed of two adhered NOMEX (heat-resistant polyamide paper) with PEN (polyethylene naphthalate) therebetween is on the market under the product name NPN-333 (manufactured by Nitto Shinko Ltd.,) and can be used. The NOMEX is made of polyamide resin fiber, that is, so-called Kevlar fiber, and electrical insulation is ensured therein by filling gaps between fibers with the PEN.

Also, the insulating paper piece for electric motors may be formed by a single sheet, or may be united by bonding a plurality of sheets together. In this case, bonding of the plurality of sheets can be made by means of an adhesive, or by ultrasonic joining without the use of an adhesive.

Also, preferably, one or plural loop-shaped unit configurations comprising the two slot cell portions and the two phase insulation portions are lined up in the direction of extension of the phase insulation portions, and extensions of the phase insulation portions are connected together to form an integrated unit, so that electrical insulation of the plural unit coils is achieved.

That is, the excellent function and effect described above can be obtained in an insulating paper piece for electric motors having only one loop-shaped unit configuration composed of the two slot cell portions and the two phase insulation portions, whereby it is possible to accommodate one single pole coil, but in the case where two or more unit configurations are further unified, one insulating paper piece for electric motors can accommodate a plurality of single pole coils and thus it is possible to reduce the number of insulating paper pieces for electric motors.

Also, the phase insulation portions comprise overlapping portions extended from both ends thereof, so that when a plurality of the insulating paper pieces for electric motors are mounted on the stator core, the respective portions of the adjacent insulating paper pieces can overlap one another. In this case, the phase insulation portions of the insulating paper pieces for electric motors can be arranged along a whole circumference of the stator core in a ring-shaped manner without breaks, so that it is possible to further heighten the effect of phase insulation. Also, preferably, the phase insulation portions face directly against the coil ends and can form a three-dimensional shape to wrap the coil ends partially or wholly. In this case, it is possible to further heighten the effect of phase insulation between ends of coils of different phases.

Further, the insulating paper piece for electric motors is a part of a standard sheet having electrical insulating property that is cut and bent. In this case, it is possible to relatively easily fabricate the insulating paper piece for electric motors.

Here, it is possible to apply a three-layered composite sheet composed of two heat-resistant sheets, which are joined together with an adhesive and are made of, for example, polyamide resin, as the standard sheet as described above.

Also, reinforcement sheets are applied partially to the standard sheet to provide reinforcements having a large thickness. In this case, reinforcement can be achieved by thickening a particular portion or portions of an insulating paper piece for electric motors without further thickening the whole insulating paper piece. Therefore, it is possible to achieve reinforcement of a necessary portion or portions while leaving, for example, the slot cell portions thin to retain space in the slots.

An insulation sheet identical to the standard sheet can be applied as a sheet for reinforcement. Also, the sheet for reinforcement and the standard sheet can be joined together by the use of an adhesive or by ultrasonic joining without the use of an adhesive.

Also, the insulating paper piece for electric motors is a substantially square- or rectangular-shaped standard sheet, as follows.

For example, a standard sheet having a substantially rectangular-shaped external form delineated by a pair of longitudinal lines arranged substantially parallel to each other and a pair of transverse lines arranged substantially perpendicular to the longitudinal lines, that is partially cut and bent, is used, the standard sheet comprising at least two first cutting lines provided substantially parallel to the longitudinal sides of the sheet, two second cutting lines provided substantially parallel to the transverse sides and connecting with the two first cutting lines to form a substantially rectangular-shaped central opening, a total of four third cutting lines provided substantially parallel to the transverse sides and extending from both ends of the respective first cutting lines in opposite directions toward the central opening, and a total of four fourth cutting lines located toward the transverse sides from the central opening and extending inward and substantially parallel to the transverse sides from the pair of longitudinal lines, inner piece portions interposed between the pair of third cutting lines opposed to and substantially parallel to each other, and outer piece portions interposed between the pair of fourth cutting lines opposed to and substantially parallel to each other are bent in a manner to cause the first cutting lines and the longitudinal sides, which are adjacent to each other, to approach each other, whereby at least two slot cell portions having a substantially U-shaped cross section can be formed, and those portions which are interposed between the third cutting lines and the transverse sides comprise the phase insulation portions.

In this case, the use of the standard sheet makes it possible to relatively easily fabricate a single insulating paper piece for electric motors, which contains at least two slot cell portions and two phase insulation portions. In addition, the standard sheet can of course be one formed of only one sheet or else one sheet-like item can be formed by joining a plurality of sheet pieces together. In the case where a plurality of sheet pieces are joined to be used, portions corresponding to, for example, the slot cell portions and portions corresponding to the phase insulation portions can be formed from materials which are different in thickness and quality.

Also, preferably, fifth cutting lines, respectively, having a predetermined length and provided substantially parallel to the first cutting lines are connected to the third cutting lines, and portions interposed between the fifth cutting lines and the first cutting lines are turned back or folded, away from the third cutting lines, whereby it is possible to form cuff portions projecting from the slots of the stator core and turned back toward an end surface of the stator core. In this case, formation of the cuff portions makes it possible to ensure a sufficient distance between the coil ends and the end surface of the stator core.

Also, preferably, reinforcement paper pieces for cuffs, which have been separately prepared, are applied to the ends of the inner piece portions which are opposed to the third cutting lines, to make the ends larger in thickness than other portions to enable the formation of cuff portions without turning-back or folding. In this case, it is possible to increase the rigidity of the cuff portions, thus enabling preventing the cuff portions from bending.

Also, preferably, the second cutting lines and the third cutting lines are provided on the same lines. In this case, the second cutting lines and the third cutting lines are easily formed, and so it is possible to facilitate manufacture of an insulating paper piece for electric motors.

Also, preferably, the second cutting lines and the third cutting lines are arranged such that the space between the two second cutting lines is larger than the space between the two third cutting lines, and sixth cutting lines are provided on extensions of the second cutting lines, in parallel and opposed to the third cutting lines, so that by bending the portions between the third cutting lines and the sixth cutting lines in the same direction as that in which the inner piece portions are bent, upright covering portions in the vicinity of boundaries between the slot cell portions and the phase insulation portions can be formed to cover the end portions of the single pole coil. In this case, formation of the upright covering portions makes it possible to further heighten the effect of phase insulation.

Also, preferably, the second cutting lines and the third cutting lines are arranged such that a spacing between the two second cutting lines is smaller than a spacing between the two third cutting lines, and by bending portions, whose ends are at the second cutting lines, so as to approach the transverse sides, underside covering portions covering a part of those portions of the coil ends of the single pole coil, which are opposed to the stator core, are formed. In this case, formation of the underside covering portions makes it possible to further heighten the effect of phase insulation.

BRIEF DESCRIPTION OF THE DRAWINGS

The invention will be described with reference to the drawings, in which.

DETAILED DESCRIPTION OF PREFERRED EMBODIMENTS

Figure 1:
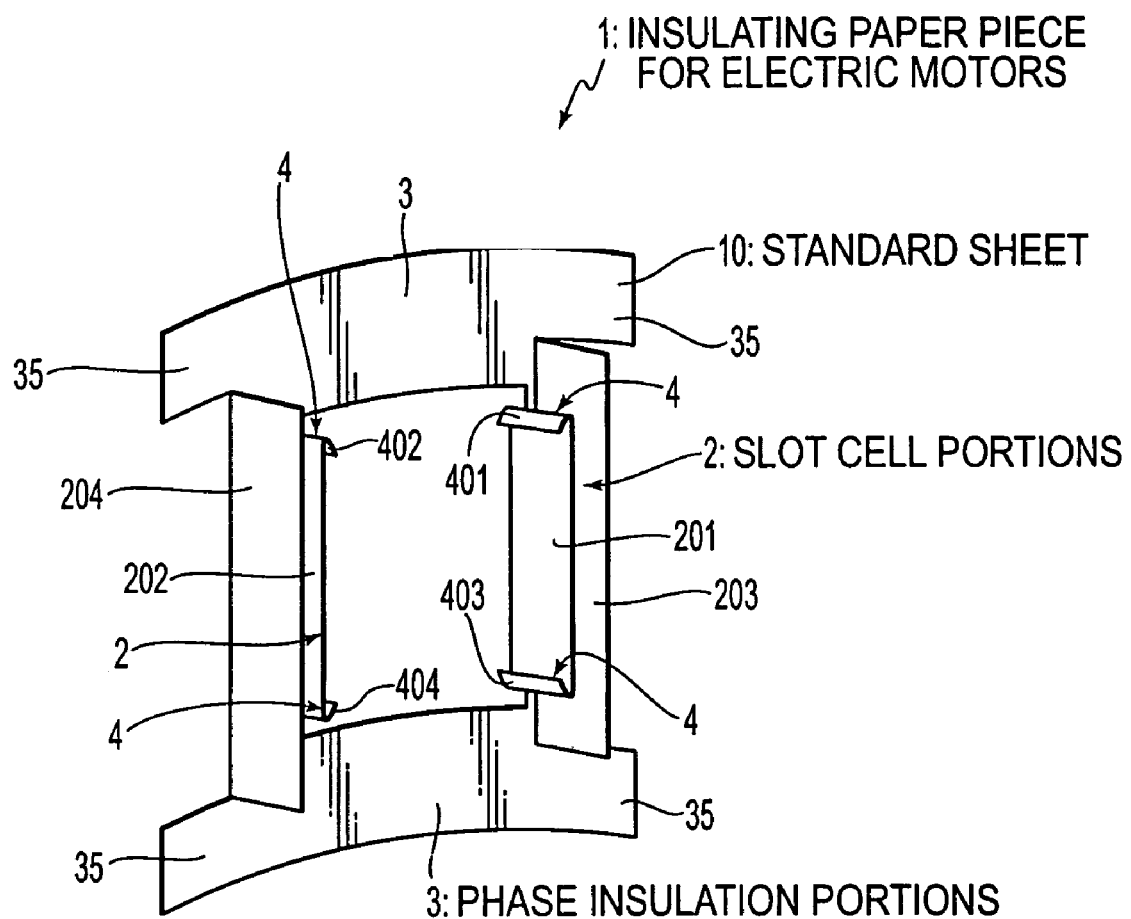
FIG. 1 is a perspective view showing an insulating paper piece for electric motors, according to a first example.

An insulating paper piece for electric motors and an electric motor according to a first example will be described with reference to FIGS. 1 to 8. An insulating paper piece 1 for electric motors in the embodiments is one for enhancing electrical insulation in areas, in which single pole coils 8

(FIGS. 3 to 8) provided on a stator core 5 (FIG. 3) are disposed adjacent to one another.

The insulating paper piece comprises at least two slot cell portions 2 arranged in two slots of the stator core, in which two portions to be inserted 81 of one single pole coil 8 are received, and two phase insulation portions 3 arranged to connect respective ends of the two slot cell portions 2 to form integrated loops and disposed to face directly against the coil ends 82 of the single pole coil 8.

Figure 2:
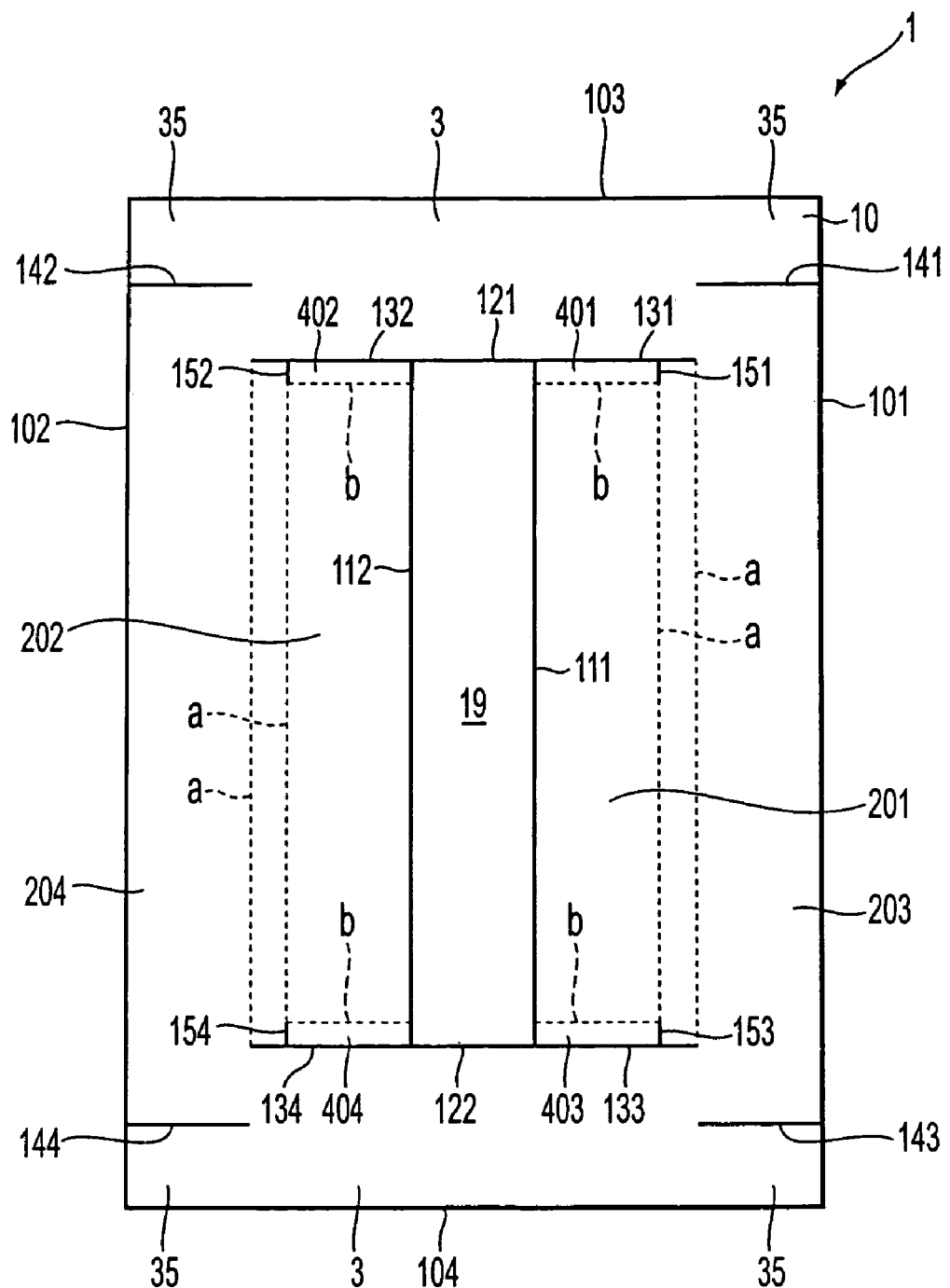
FIG. 2 is a view illustrating a state in which a standard sheet forming the insulating paper piece for electric motors, according to the first example, is flattened.

As shown in FIGS. 1 and 2, the insulating paper piece 1, for electric motors, according to the embodiment is structured such that a part of a standard sheet 10 having an electrical insulating property is cut and folded. Used as the standard sheet 10, in this exemplary embodiment, was a product named NPN-333 (manufactured by Nitto Shinko Ltd.,) a three-layered composite sheet composed of heat-resistant sheets (NOMEX) made of polyamide resin and adhered to each other with PEN (polyethylene naphthalate) therebetween. Sheets having a thickness of 0.25 mm were used.

The insulating paper piece 1 has a substantially rectangular-shaped external form having a pair of longitudinal sides 101, 102 arranged substantially parallel to each other and a pair of transverse sides 103, 104 arranged substantially perpendicular to the longitudinal sides 101, 102, as shown in FIG. 2.

The standard sheet 10 comprises two first cutting lines 111, 112 provided substantially parallel to the longitudinal sides 101, 102 and two second cutting lines 121, 122 provided substantially parallel to the transverse sides 103, 104 in a manner to connect the two first cutting lines 111, 112 to each other to form a substantially rectangular-shaped central opening 19 between the two first cutting lines 111, 112.

Also, the standard sheet 10 comprises a total of four third cutting lines 131 to 134, respectively, provided substantially parallel to the transverse sides 103, 104, extending from the ends of the respective first cutting lines 111, 112 in opposite directions to the central opening 19. In the embodiment, the second cutting lines 121, 122 and the third cutting lines 131 to 134 are provided on the same lines. Also, the standard sheet 10 comprises a total of four fourth cutting lines 141 to 144 between the transverse sides 103, 104 and the central opening 19 that extend inward and substantially parallel to the transverse sides 103, 104 from the pair of longitudinal sides 101, 102.

Also, as shown in FIGS. 1 and 2, inner piece portions 201, 202 interposed between the pair of third cutting lines 131, 133, or between the pair of third cutting lines 132, 134, and outer piece portions 203, 204 interposed between the pair of fourth cutting lines 141, 143, or 142, 144 opposed to and substantially parallel to each other, are bent, along dot lines a, in a manner to cause the first cutting line and the longitudinal side (111, 101, or 112, 102), which are adjacent to each other, to approach each other, whereby at least two slot cell portions 2, having a substantially U-shaped cross section are formed. Those portions which are surrounded by the third cutting lines 131 to 134 and the transverse sides 103, 104, form the phase insulation portions 3.

Further, in this example, fifth cutting lines 151 to 154, respectively, having a predetermined length and provided substantially parallel to the first cutting lines 111, 112 are connected to respective third cutting lines 131 to 134, as shown in FIGS. 1 and 2, and portions 401 to 404 interposed between the fifth cutting lines 151 to 154 and the first cutting lines 111, 112 are folded away from the third cutting lines 131 to 134 along dash lines b, whereby it is possible to form cuff portions 4 projecting from slots 50 of the stator core 5 and folded toward an end surface of the stator core 5.

Also, the phase insulation portions 3 comprise overlapping portions 35 extended from both ends thereof, as shown in FIGS. 1 and 2, so that when a plurality of insulating paper pieces 1 for electric motors are mounted on the stator core 5, the respective overlapping portions 35 on adjacent insulating paper pieces 1 for electric motors can overlap one another. In addition, dot lines a in FIG. 2 define portions corresponding to valleys when the paper piece 1 is bent, and dash lines b define portions corresponding to the fold line when the paper piece is folded.

An example of portions of an electric motor making use of the insulating paper pieces 1 for electric motors is shown in FIGS. 3–8.

Figure 3:
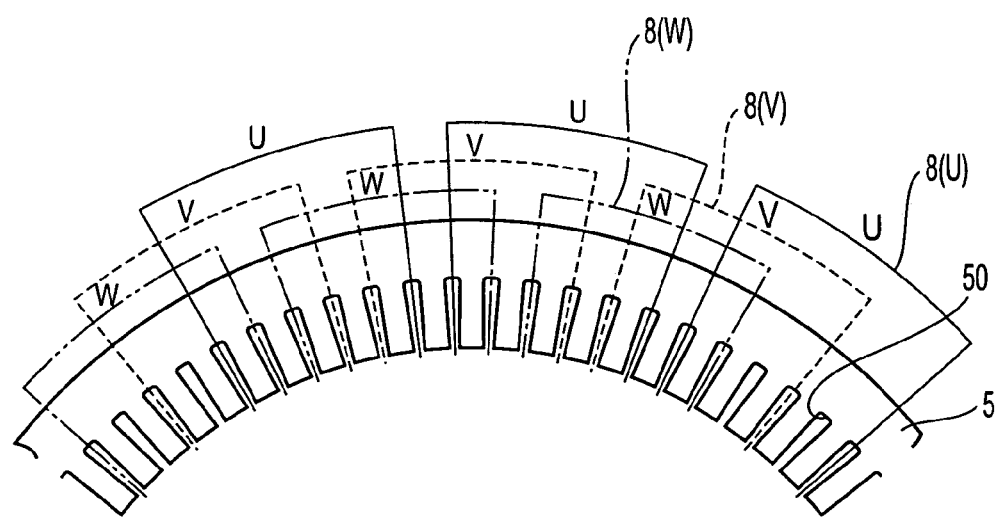
FIG. 3 is a view showing an arrangement of a stator core and three-phase single pole coils in the first example.

The electric motor is one of a distributed winding structure comprising, as shown in FIG. 3, a ring-shaped stator core 5 with a multiplicity of slots 50 provided at an inner periphery, in which single pole coils 8 of three (U, V, W) different phases are arranged. Coil ends of the pole coils are arranged so that one portion of a coil end of one phase overlaps another portion of a coil end of different phase.

Provided on the stator core 5 are insulating paper pieces for electric motors to enhance electrical insulation in areas in which single pole coils 8 adjoin one another, that is, inner wall surfaces of the slots 50 and areas in which coil ends having different phases overlap.

Figure 15:
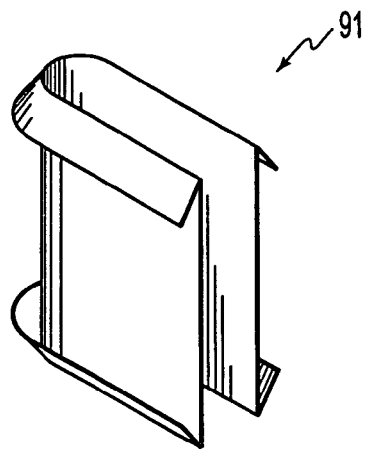
FIG. 15 is a view showing a slot insulation paper piece in a conventional example.
Figure 16:
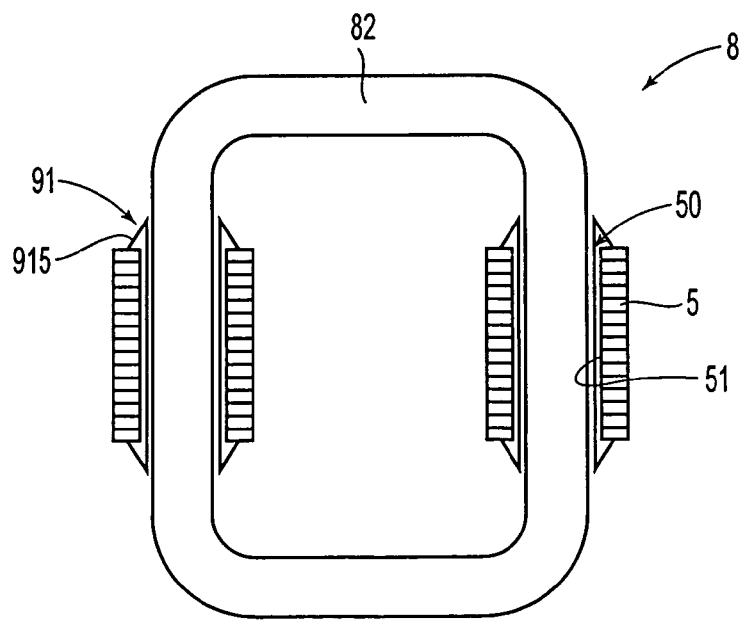
FIG. 16 is a view illustrating a state, in which a slot insulation paper piece is mounted in slots and a single pole coil is arranged in the conventional example.
Figure 17:
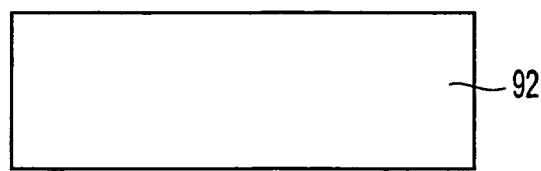
FIG. 17 is a view showing a phase insulation paper piece in a conventional example.
Figure 18:
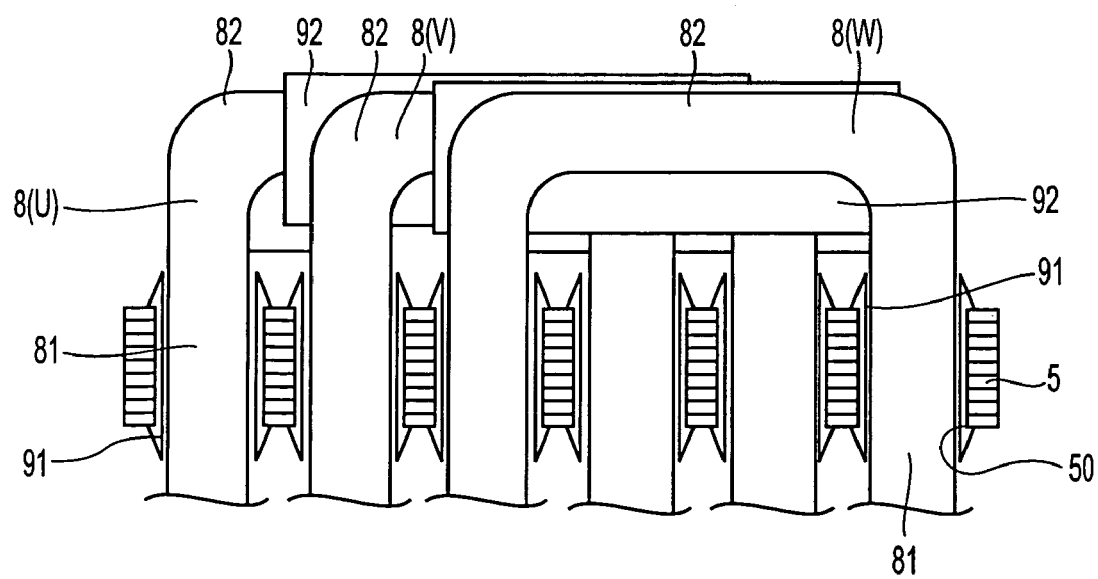
FIG. 18 is a view illustrating a state, in which slot insulation paper pieces are mounted in slots and single pole coils are arranged in the conventional example.

In this example, the insulating paper pieces 1 for electric motors are used in two slots 50 into which coils of V-phase and W-phase are to be respectively inserted, and for U-phase the conventional slot insulation paper pieces 91 (see FIG. 15), arranged only in the one of the slots 50, are used.

Figure 4:
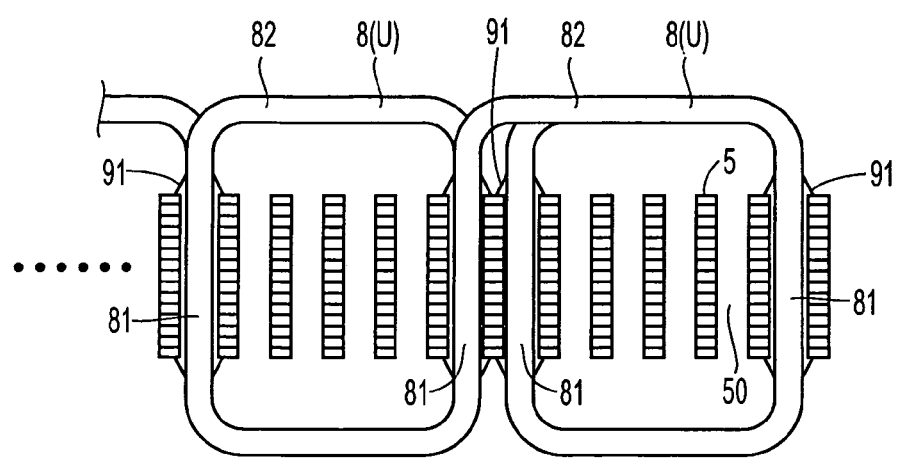
FIG. 4 is a view illustrating a state, in which single pole coils of U-phase are arranged on the stator core, according to the first example.

The structure will be described in the order in which the single pole coils 8 are arranged. First, as shown in FIG. 4, conventional type slot insulation paper pieces 91 are mounted in those slots 50 on the stator core 5 to receive the portions to be inserted 81 of the U-phase single pole coils 8 that are to be subsequently inserted into the slots 50. The single pole coils 8 (U) of U-phase are then inserted and arranged in the slots 50. At this time, no different phase coils are present.

Figure 5:
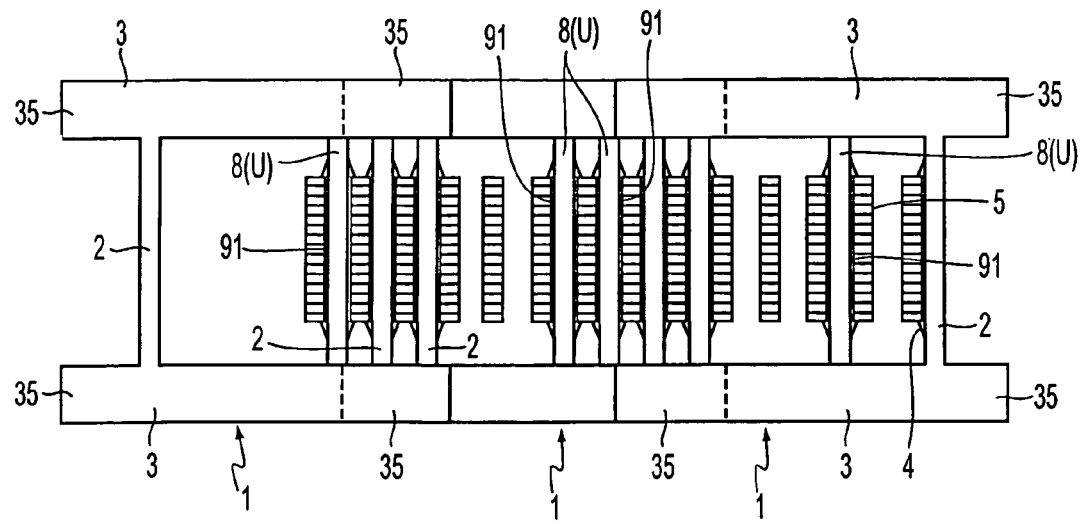
FIG. 5 is a view illustrating a state, in which insulating paper pieces for electric motors for V-phase are arranged on the stator core, according to the first example.

Subsequently, the slot cell portions 2 of the insulating paper piece 1 are inserted into and arranged in two slots 50 on the stator core 5, into which two portions to be inserted of the respective single pole coils having the V-phase are to be received, as shown in FIG. 5. That is, a plurality of insulating paper pieces 1 for the V-phase are inserted and positioned to receive a plurality of single pole coils 8 (V). Also, the overlapping widths 35 of the respective insulating paper pieces 1 for electric motors are caused to overlap the phase insulation portions 3 along the entire circumference of the stator core 5 in a ring-shaped manner. Thereby, as shown in FIG. 5, the coil ends 82 of the single pole coils 8 (U) having the U-phase wholly face directly against the phase insulation portions 3 on the insulating paper pieces 1 for the V-phase and thus are covered from the inner peripheral side. Also, as shown in the FIG. 1, the slot cell portions 2, positioned in the respective slots 50 are bent to have a substantially U-shaped cross section.

Figure 6:
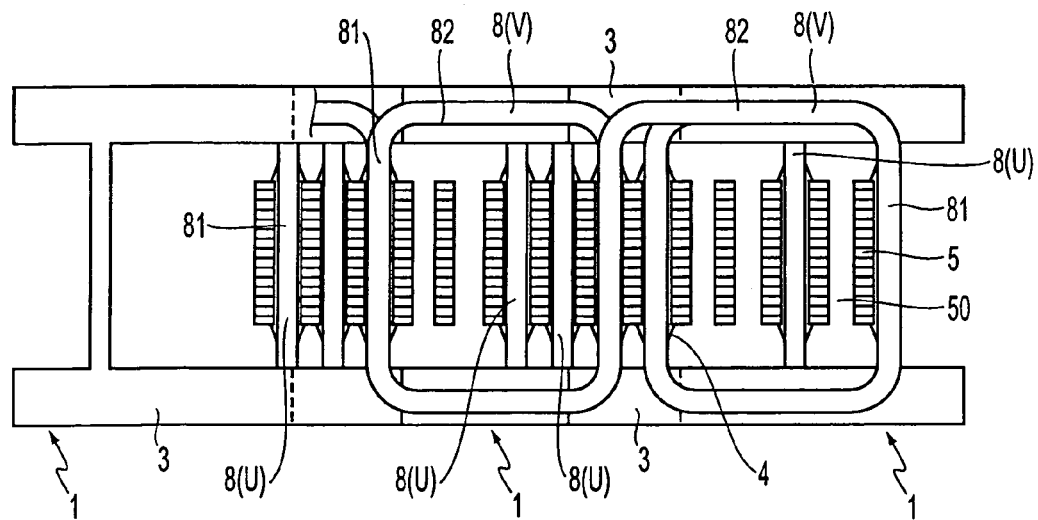
FIG. 6 is a view illustrating a state, in which single pole coils of V-phase are arranged on the stator core according to the first example.

Subsequently, the portions to be inserted 81 of the single pole coil 8 for V-phase are inserted into the slots 50 in which the slot cell portions 2 of the electric motor insulating paper piece 1 for V-phase have been mounted, as shown in the FIG. 6. Thus, the single pole coil 8 (V) having the V-phase is arranged on the stator core 5. At this time, due to the presence of the phase insulation portions 3 of the insulating paper piece 1 for V-phase, the coil ends 82 of the single pole coil 8 (V) for V-phase are positioned without contacting the coil ends 82 of the single pole coil 8 (U) of U-phase as described above.

Figure 7:
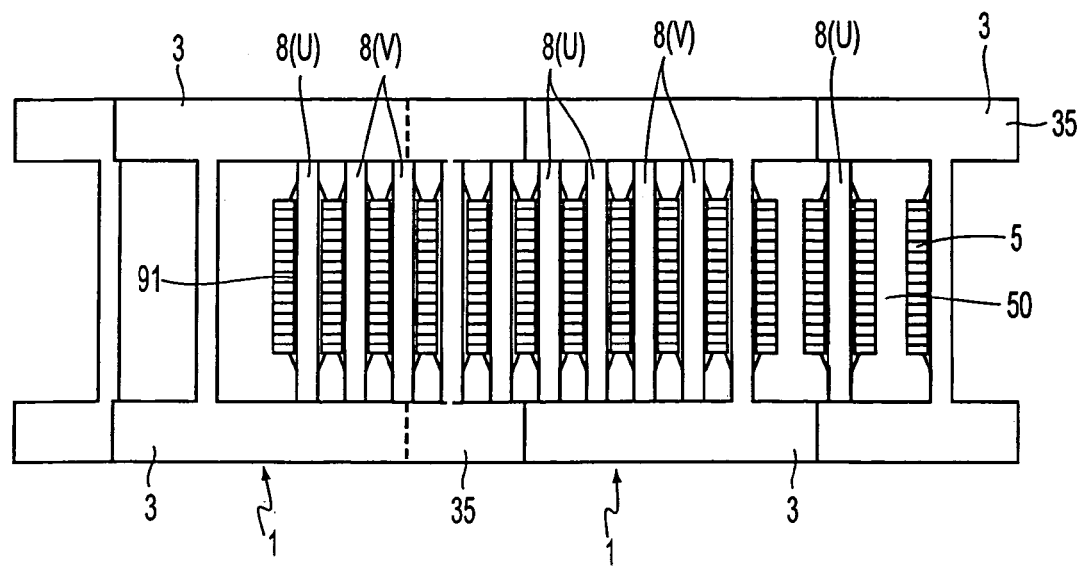
FIG. 7 is a view illustrating a state in which insulating paper pieces for electric motors for W-phase are arranged on the stator core according to the first example.

Next, the slot cell portions 2 of the insulating paper piece 1, structured as described above, are inserted and arranged, as shown in FIG. 7, into two slots 50 on the stator core 5, into which two portions to be inserted 81 of the respective single pole coils having the W-phase are to be received. That is, a plurality of the insulating paper pieces 1 for W-phase are inserted and positioned to accommodate a plurality of single pole coils 8 (W). Also, the overlapping portions 35 of the respective insulating paper pieces 1 for W-phase are caused to overlap along the entire circumference of the stator core 5 in a ring-shaped manner. Thereby, as shown in FIG. 7, the coil ends 82 of the single pole coils 8 (V) for V-phase wholly face directly against the phase insulation portions 3 on the insulating paper pieces 1 for the W-phase and, thus, are covered from the inner peripheral side. Also, the slot cell portions 2 positioned in the respective slots 50 are bent to have a substantially U-shaped cross section.

Figure 8:
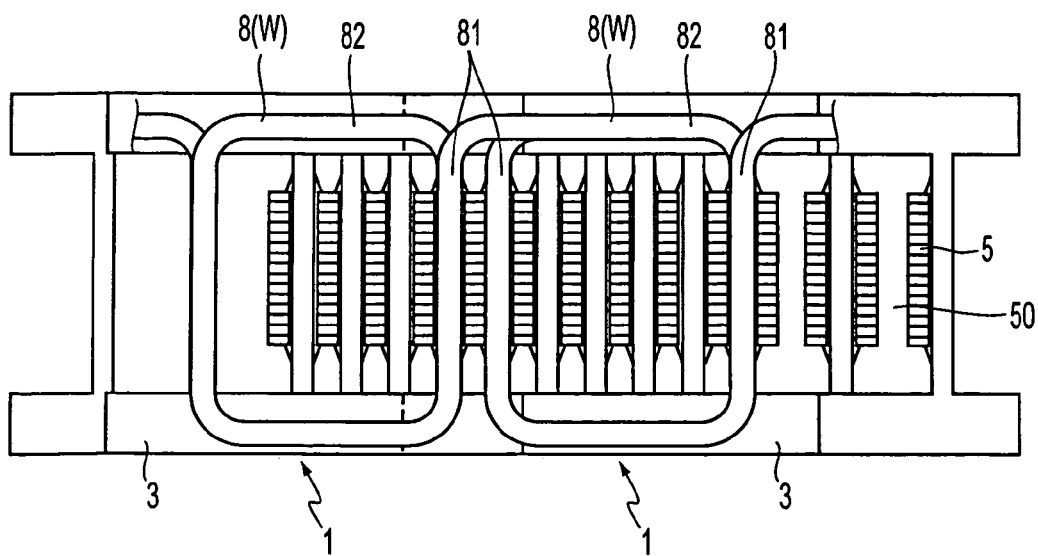
FIG. 8 is a view illustrating a state, in which single pole coils of W-phase are arranged on the stator core, according to the first example.

Subsequently, the portions to be inserted 81 of the single pole coil 8 for W-phase are inserted into the slots 50 in which the slot cell portions 2 of the insulating paper piece 1 for W-phase have been mounted, as shown in the FIG. 8. Thus, the single pole coil 8 (W) for W-phase is arranged on the stator core 5. At this time, due to the presence of the phase insulation portions 3 of the insulating paper piece 1 for W-phase, the coil ends 82 of the single pole coil 8 (W) for W-phase are positioned without contacting the coil ends 82 of the single pole coil 8 (V) of V-phase, which have been mounted as described above.

In this manner, a single insulating paper piece 1 in this embodiment contains two slot cell portions 2 for those slots in which one single pole coil 8 is inserted, and two phase insulation portions 3 arranged to connect these slot cell portions 2. Therefore, in the case where the insulating paper piece 1 is mounted in the slots 50 of the stator core 5 and the single pole coil 8 is mounted on the stator core 5, the two portions to be inserted 81 of the single pole coil 8 can be received by the two slot cell portions 2, and the entire length of the coil ends 82 formed to connect the two portions to be inserted 81 can be caused to face directly against the phase insulation portions 3. Also, unification of the slot cell portions 2 and the phase insulation portions 3 makes it possible to inhibit loss of contact between the phase insulation portions 3 and the coil ends 82. Therefore, it is possible to surely improve the electrical insulation between the coil ends 82 of different phases arranged with the phase insulation portions 3 therebetween, to say nothing of electrical insulation between the single pole coil 8 and the stator core 5.

Also, the two phase insulation portions 3 are connected to each other through the slot cell portions 2. Therefore, it is not necessary to insert additional parts in addition to the slot cell portions 2 into the slots 50 of the stator core 5, so that degradation in ease of coil insertion and in space does not occur.

Figure 9:
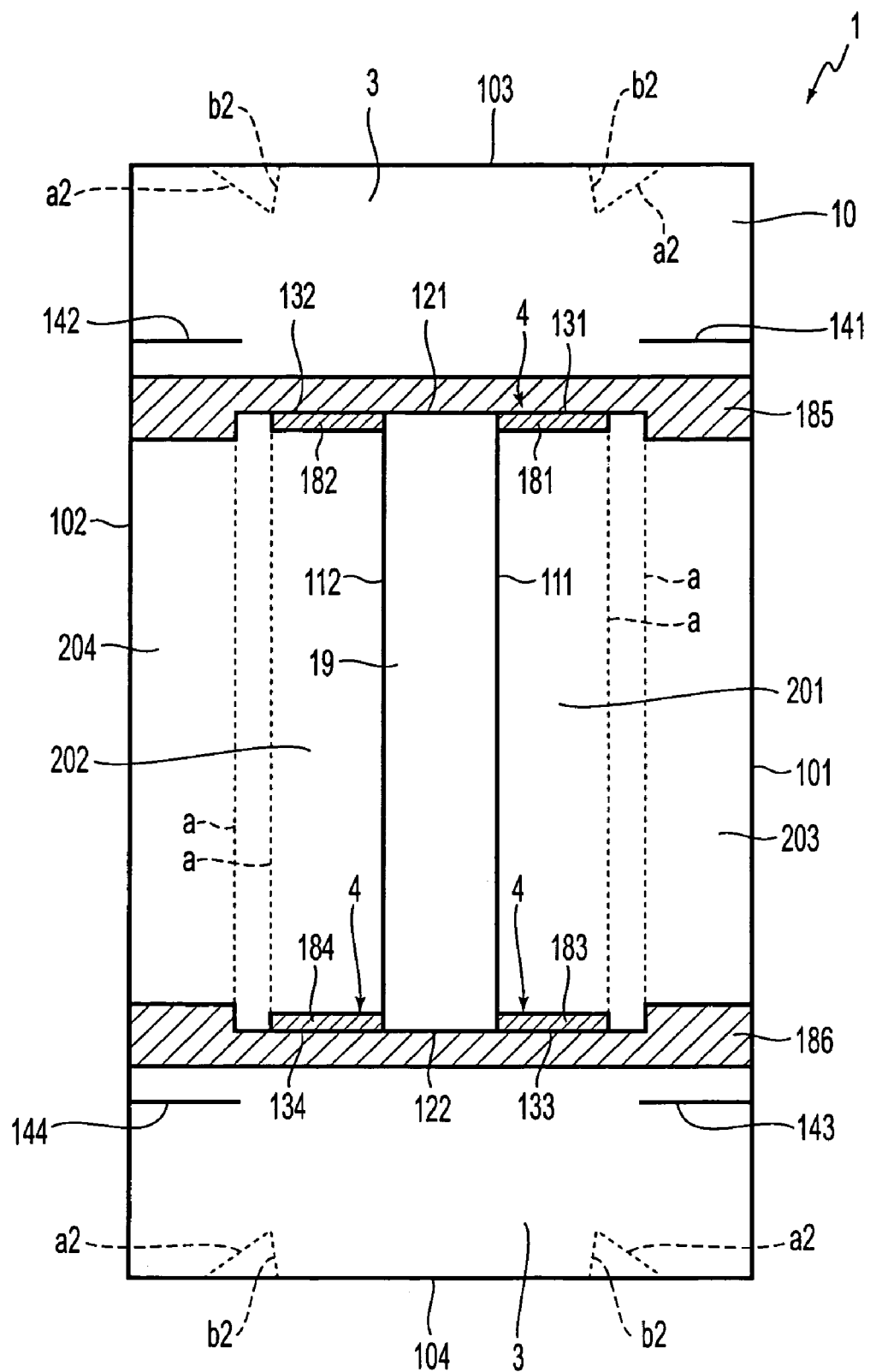
FIG. 9 is a view illustrating a state, in which a standard sheet forming an insulating paper piece for electric motors according to a second example is flattened.

In a second exemplary insulating paper piece 1, the same standard sheet 10 as that in the first exemplar is used, positions of cutting lines are slightly modified, reinforcement sheets 181 to 186 are used, and other points are modified, as shown in FIG. 9.

More specifically, the standard sheet 10, as adapted according to the second example, has a longitudinal length greater than that in the first example, as shown in FIG. 9. Further, first cutting lines 111, 112, second cutting lines 121, 122, third cutting lines 131 to 134, and fourth cutting lines 141 to 144 are provided in the same manner as in the first example, and a central opening 19 is provided.

On the other hand, different from the first example, no bent cuff portions are provided, but rather reinforcement sheets 181 to 184 are joined in four locations where the cuff portions 4 were provided, by means of ultrasonic joining. In addition, no fifth cutting lines, as in the first example, are provided.

Further, as shown in the figure, according to the second example, reinforcement sheets 185, 186 are joined and arranged on those portions of the phase insulation portions 3 which are close to the slot cell portions 2. In addition, all of the reinforcement sheets 181 to 186 are made of the same material, having the same thickness as those of the standard sheet 10.

Figure 10:
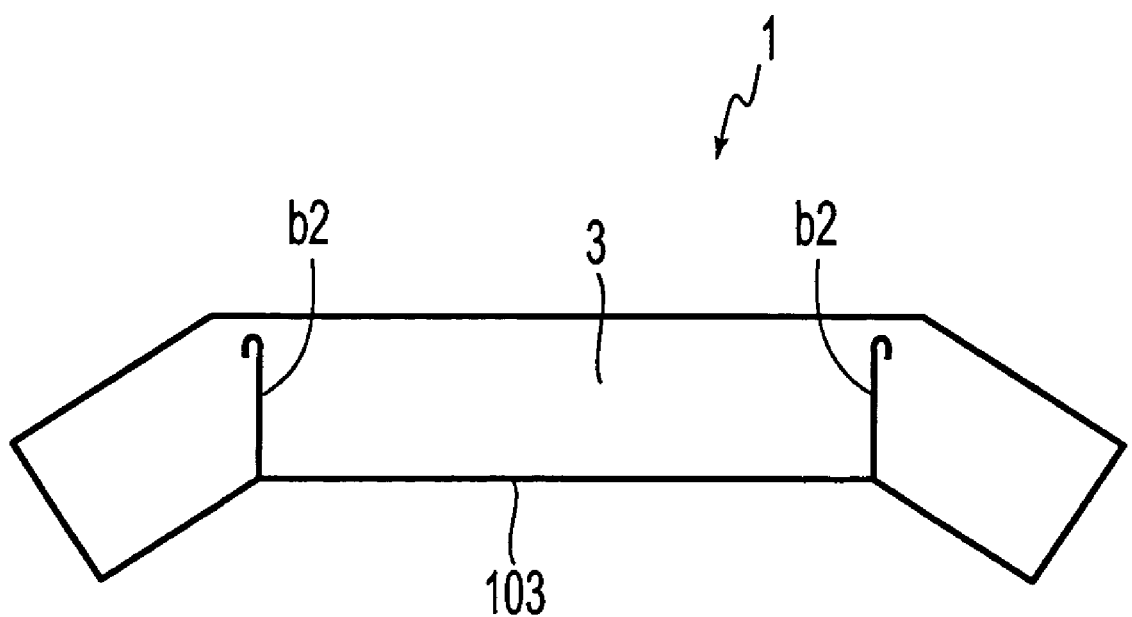
FIG. 10 is a view illustrating a state in which a phase insulation portion of the insulating paper piece for electric motors according to the second example is formed to assume a three-dimensional configuration to wrap a coil end.

Also, in this example, the distance between the fourth cutting lines 141 to 144 and the transverse sides 103, 104 is increased in order that the phase insulation portions 3 be larger in axial length than those in the first example. Thereby, portions of the phase insulation portions 3 close to the transverse sides 103, 104 can be formed three-dimensionally so as to wrap the coil ends 82 as shown in FIG. 10. Also, in this example, dashed bend lines a2, b2 are additionally provided so as to enable easy formation of the three-dimensional configuration. Overlapping portions generated by bending the phase insulation portions along the bend lines a2, b2 are preferably joined together by the use of an adhesive, or by means of ultrasonic joining.

The second example is configured so that the phase insulation portions 3 face directly against the coil ends 82 and can form a three-dimensional configuration to wrap around the coil ends. Therefore, it is possible to further heighten the effect of phase insulation between the ends of coils of different phases. Further, with the example, the reinforcement sheets 181 to 186 are adhered to some portions of the standard sheet 10 to provide reinforcement portions having an increased thickness. These reinforcement portions serve the role of the cuff portions 8 and the phase insulation portions 3. Thereby, because only such particular portions are thickened for reinforcement, the slot cell portions 2 remain thin, thus not changing the space in the slots. In addition, the reinforcement portions of the phase insulation portions 3 can protect the phase insulation portions 3 when a so-called lacing process is carried out.

In other aspects, the same functions and effects as found in the first example can be obtained.

Figure 11:
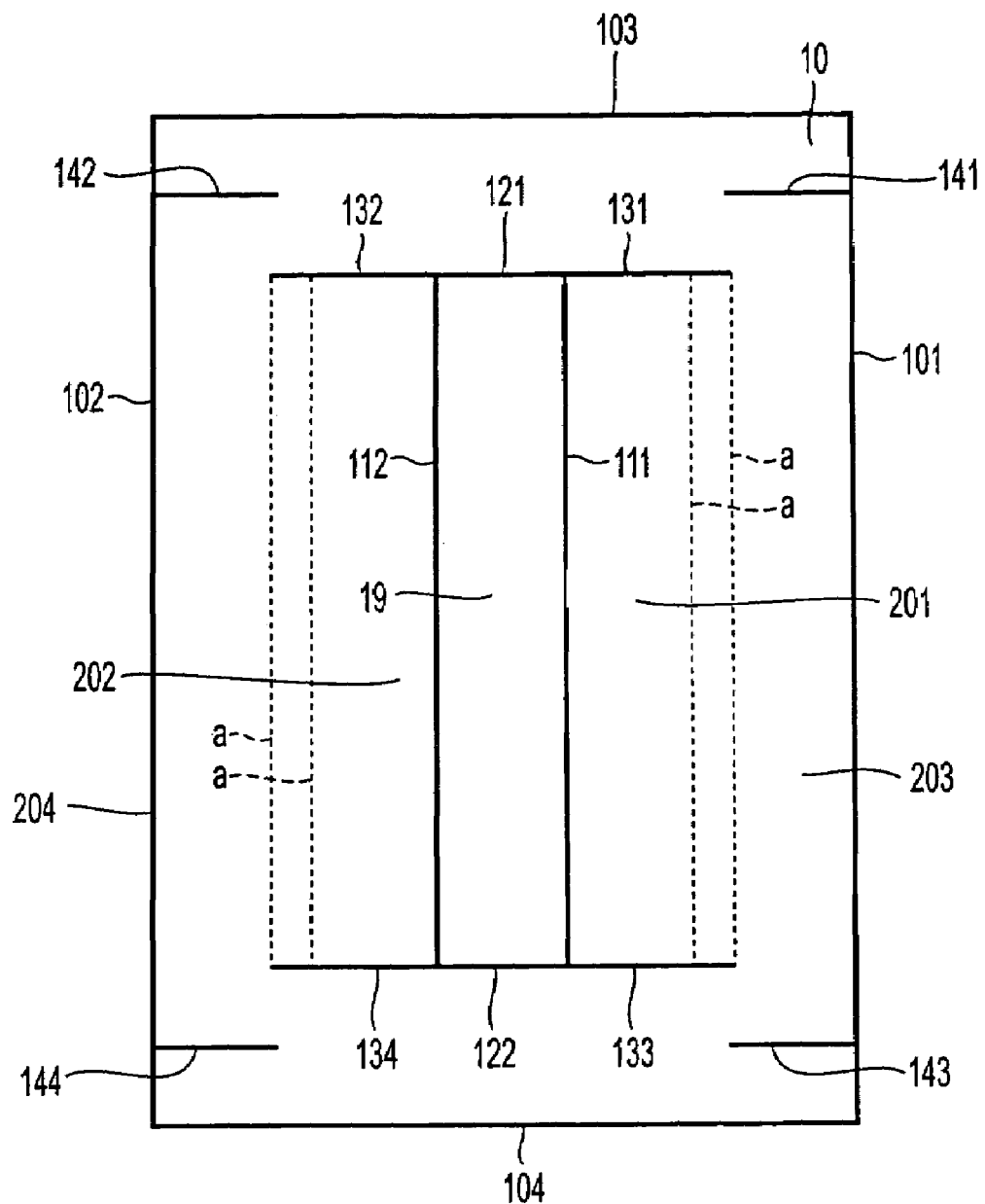
FIG. 11 is a view illustrating a state in which a standard sheet forming an insulating paper piece for electric motors, according to a third example, is developed.

In another exemplary insulating paper piece 1, the same standard sheet 10 is used as that in the first example, but no bent cuff portions are provided. This example is shown in FIG. 11.

More specifically, first cutting lines 111, 112, second cutting lines 121, 122, third cutting lines 131 to 134, and fourth cutting lines 141 to 144 are provided on the standard sheet 10 having a substantially rectangular-shaped external form, with a pair of longitudinal sides 101, 102 and a pair of transverse sides 103, 104, and a central opening 19 in the same manner as in the first example, as shown in the figure.

On the other hand, the current insulating paper piece 1 differs from the first example in that no bent cuff portions are provided. Therefore, the fifth cutting lines, found in the first example, are not provided.

In this case, the insulating paper piece 1 is simpler than the first example, so that it is possible to more easily manufacture the insulating paper piece 1 for electric motors. In addition, non-bent cuff portions can be of course formed by adjusting the length of the inner piece portions 201, 202. In other aspects, the same functions and effects as in the first example can be obtained.

Figure 12:
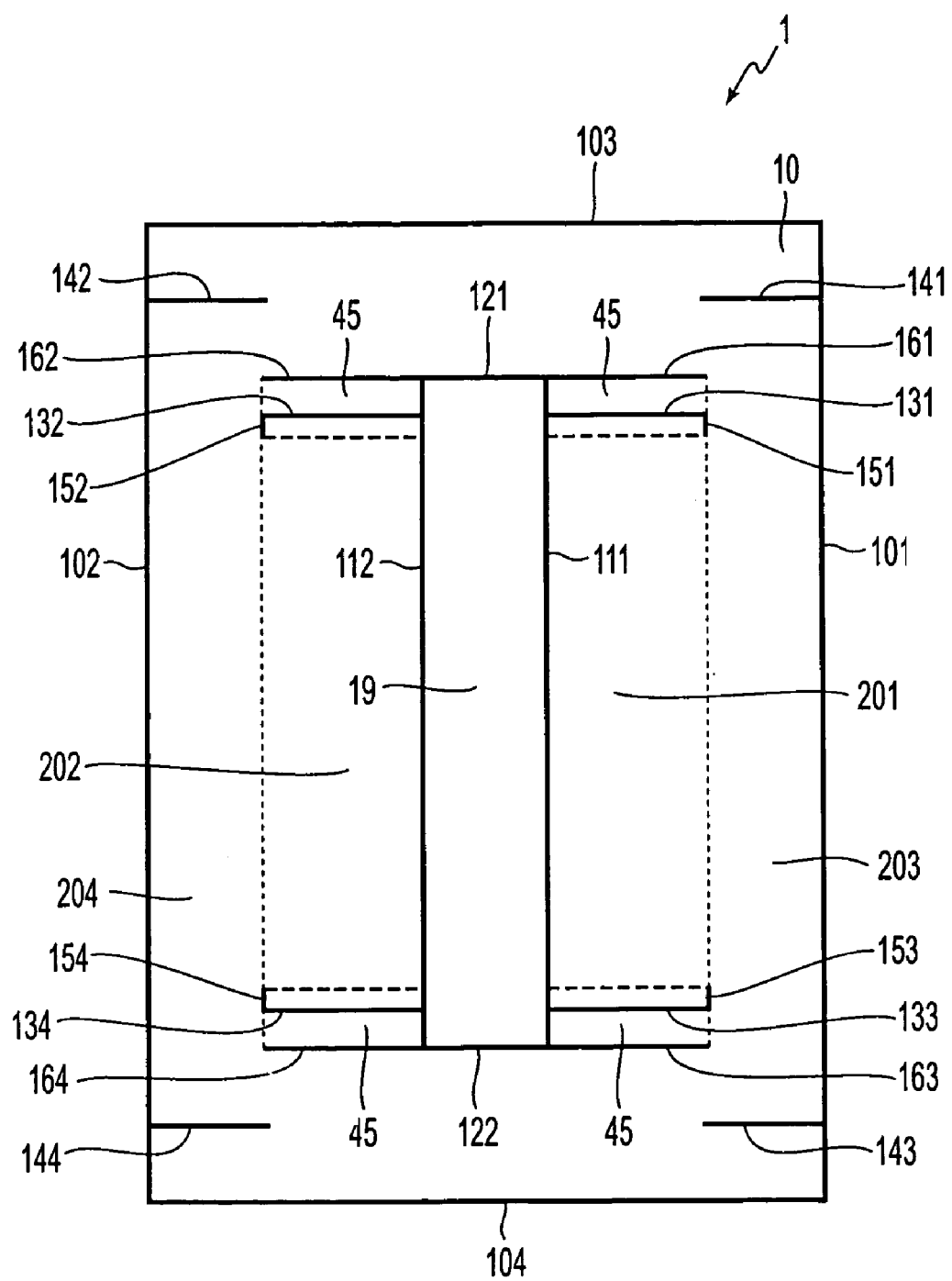
FIG. 12 is a view illustrating a state in which a standard sheet forming an insulating paper piece for electric motors according to a fourth example is flattened.

A fourth exemplary insulating paper piece 1 for electric motors is based on the insulating paper piece 1 according to the first example, with upright covering portions 45, covering coil ends of a single pole coil, formed as shown in FIG. 12.

That is, with the insulating paper piece 1, according to this example, first cutting lines 111, 112, second cutting lines 121, 122, third cutting lines 131 to 134, fourth cutting lines 141 to 144, and fifth cutting lines 151 to 154 are provided on a standard sheet 10 having a substantially rectangular-shaped external form, having a pair of longitudinal sides 101, 102 and a pair of transverse sides 103, 104, in the same manner as in the first embodiment, and a central opening 19 is provided, as shown in the figure.

However, in this example, the second cutting lines 121, 122 and the third cutting lines 131 to 134 are arranged so that the spacing between the two second cutting lines 121, 122 is larger than the spacing between the two third cutting lines 131, 133, or 132, 134. Further, sixth cutting lines 161 to 164, respectively, are provided as extensions of the second cutting lines 121, 122 and are parallel with and opposed to the third cutting lines 131 to 134.

By bending the portions between the third cutting lines 131 to 134 and the sixth cutting lines 161 to 164, in the same direction as that in which the inner piece portions 201, 202 are bent, upright covering portions 45 in the vicinity of boundaries between the slot cell portions 2 and the phase insulation portions 3 can be formed to cover those upright portions of coil ends 82 of a single pole coil 8 which extend out of the slots 50 rising substantially perpendicularly to the end surface of the stator core 5. In this example, formation of the upright covering portions 45 makes it possible to further heighten the effect of phase insulation. In other aspects, the same functions and effects as in the first example can be obtained.

Figure 13:
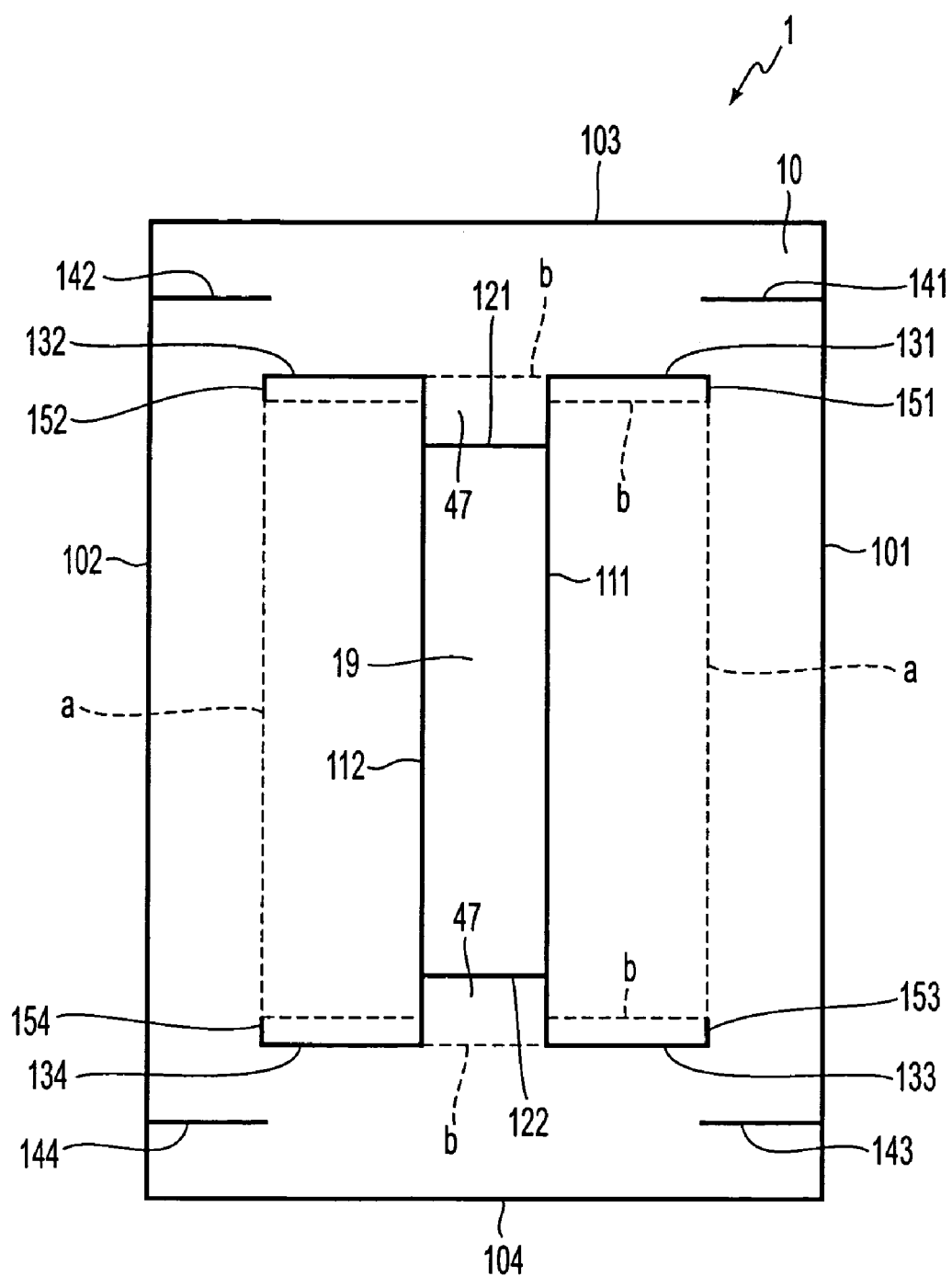
FIG. 13 is a view illustrating a state in which a standard sheet forming an insulating paper piece for electric motors according to a fifth example is flattened.

A fifth example of an insulating paper piece 1 for electric motors, according to the invention, is based on the insulating paper piece used with the first example. In this insulating paper piece 1, underside covering portions 47, covering a part of those portions of coil ends 82 of a single pole coil 8 which face directly against the stator core 5, are formed, as shown in FIG. 13.

More specifically, with the insulating paper piece 1 for electric motors, according to this fifth example, first cutting lines 111, 112, second cutting lines 121, 122, third cutting lines 131 to 134, fourth cutting lines 141 to 144, and fifth cutting lines 151 to 154 are provided on a standard sheet 10 having a substantially rectangular-shaped external form. The rectangular-shaped form is provided by a pair of longitudinal sides 101, 102, a pair of transverse sides 103, 104, and a central opening 19 in the same manner as in the first example, as shown in the figure.

In addition, in this fifth example, the second cutting lines 121, 122 and the third cutting lines 131 to 134 are arranged such that a spacing between the two second cutting lines 121, 122 is smaller than a spacing between the two third cutting lines 131, 133, or 132, 134. Further, by bending along dash lines b, the portions, which have their ends at the second cutting lines 121, 122 so as to approach the transverse sides 103, 104, underside covering portions 47 covering a part of those portions of coil ends 82 of a single pole coil 8 which directly face the stator core 5 are formed. In this example, formation of the underside covering portions 47 makes it possible to further heighten the effect of phase insulation. In other aspects, the same functions and effects as in the first embodiment can be obtained.

Figure 14:
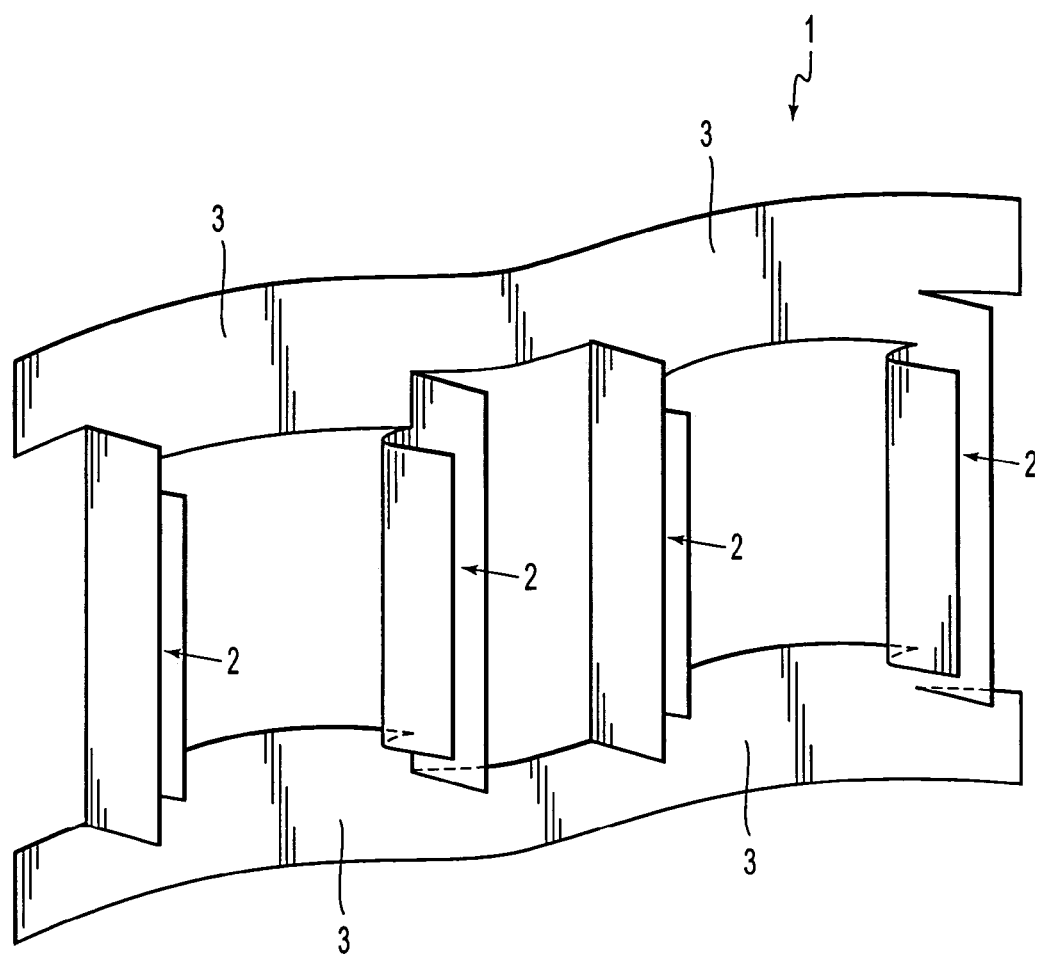
FIG. 14 is a perspective view showing an insulating paper piece for electric motors according to a sixth example.

A sixth example the insulating paper piece 1 for electric motors is a modification of the third example, with electrical insulation of a plurality of single pole coils 8 achieved by a single insulating paper piece for electric motors, as shown in FIG. 14.

More specifically, with the insulating paper piece 1 according to this example, two loop-shaped unit configurations, each composed of two slot cell portions 2 and two phase insulation portions 3, are aligned in the direction of the extension of the phase insulation portions 3, and extensions of the phase insulation portions 3 are connected together to be unified as shown in the figure, so that electrical insulation of two unit coils 8 is achieved. In the example, a single insulating paper piece 1 for electric motors can accommodate two single pole coils 8, so that it is possible to reduce the number of insulating paper pieces 1 for electric motors as used. In other aspects, the same functions and effects as in the first embodiment can be obtained.

What is claimed is:

1. An insulating paper piece for electric motors, in which electrical insulation in areas where single pole coils arranged on a stator core are adjacent is heightened, the insulating paper piece comprising:
   two slot cell portions arranged in two slots of the stator core, in which insert portions of a single pole coil are received, and
   two phase insulation portions, a phase insulation portion connecting a respective end of each of the two slot cell portions so as to form loops, and disposed to face against coil end portions of the single pole coil.

2. The insulating paper piece for electric motors according to claim 1, wherein one or plural loop-shaped unit configurations comprising the two slot cell portions and the two phase insulation portions are aligned in a direction of extension of the phase insulation portions, and extensions of the phase insulation portions are connected together to be unified, so that electrical insulation of the plural unit coils is achieved.

3. The insulating paper piece for electric motors according to claim 1, wherein the phase insulation portions comprise overlapping portions extended from both widthwise ends, so that when a plurality of the insulating paper pieces for electric motors are mounted on the stator core, the respective overlapping portions of the adjacent insulating paper pieces overlap one another.

4. The insulating paper piece for electric motors according to claim 2, wherein the phase insulation portions comprise overlapping portions extended from both widthwise ends, so that when a plurality of the insulating paper pieces for electric motors are mounted on the stator core, the respective overlapping portions of the adjacent insulating paper pieces overlap one another.

5. The insulating paper pieces for electric motors according to claim 1, wherein the phase insulation portions directly face the coil ends and form a three-dimensional shape to wrap the coil ends partially or wholly.

6. The insulating paper pieces for electric motors according to claim 2, wherein the phase insulation portions directly face the coil ends and form a three-dimensional shape to wrap the coil ends partially or wholly.

7. The insulating paper pieces for electric motors according to claim 3, wherein the phase insulation portions directly face the coil ends and form a three-dimensional shape to wrap the coil ends partially or wholly.

8. The insulating paper piece for electric motors according to claim 1, wherein the insulating paper piece for electric motors is a part of a standard sheet having a property of electrical insulation that is cut and bent.

9. The insulating paper piece for electric motors according to claim 5, wherein reinforcement sheets are applied at portions of the standard sheet to provide reinforcements giving greater thickness.

10. The insulating paper piece for electric motors according to claim 5, wherein the insulating paper piece for electric motors is used by partially cutting and bending the standard sheet having a substantially rectangular-shaped external form having a pair of longitudinal sides arranged substantially parallel to each other and a pair of transverse sides arranged substantially perpendicular to the longitudinal sides, the standard sheet comprising:

at least two first cutting lines provided substantially parallel to the longitudinal sides;

two second cutting lines provided substantially parallel to the transverse sides so as to connect the two first cutting lines to each other to form a substantially rectangular-shaped central opening between the two first cutting lines;

a total of four third cutting lines, provided substantially parallel to the transverse sides and extending from both ends of the respective first cutting lines to extend in opposite directions from the central opening; and a total of four fourth cutting lines provided between the transverse sides and the central opening, extending inward and substantially parallel to the transverse sides from the pair of longitudinal sides, wherein inner piece portions interposed between the pairs of third cutting lines opposed to and substantially parallel to each other and outer piece portions interposed between the pairs of fourth cutting lines opposed to and substantially parallel to each other are bent in a manner to cause the respective first cutting lines and the longitudinal sides which are adjacent to each other to approach each other, whereby at least two slot cell portions having a substantially U-shaped cross section can be formed, and those portions which are interposed between the third cutting lines and the transverse sides form the phase insulation portions.

11. The insulating paper piece for electric motors according to claim 7, wherein the insulating paper piece for electric motors is used by partially cutting and bending the standard sheet having a substantially rectangular-shaped external form having a pair of longitudinal sides arranged substantially parallel to each other and a pair of transverse sides arranged substantially perpendicular to the longitudinal sides, the standard sheet comprising:

at least two first cutting lines provided substantially parallel to the longitudinal sides;

two second cutting lines provided substantially parallel to the transverse sides so as to connect the two first cutting lines to each other to form a substantially rectangular-shaped central opening between the two first cutting lines;

a total of four third cutting lines, provided substantially parallel to the transverse sides and extending from both ends of the respective first cutting lines to extend in opposite directions from the central opening; and a total of four fourth cutting lines provided between the transverse sides and the central opening, extending inward and substantially parallel to the transverse sides from the pair of longitudinal sides, wherein inner piece portions interposed between the pairs of third cutting lines opposed to and substantially parallel to each other and outer piece portions interposed between the pairs of fourth cutting lines opposed to and substantially parallel to each other are bent in a manner to cause the respective first cutting lines and the longitudinal sides which are adjacent to each other to approach each other, whereby at least two slot cell portions having a substantially U-shaped cross section can be formed, and those portions which are interposed between the third cutting lines and the transverse sides form the phase insulation portions.

12. The insulating paper piece for electric motors according to claim 9, wherein fifth cutting lines having a predetermined length and provided substantially parallel to the first cutting lines are connected to the third cutting lines, and portions interposed between the fifth cutting lines and the first cutting lines are turned back away from the third cutting lines, whereby it is possible to form cuff portions projecting from the slots of the stator core and turned back toward an end surface of the stator core.

13. The insulating paper piece for electric motors according to claim 9, wherein reinforcement paper pieces serving as cuffs and which have been separately prepared are applied to those ends of the inner piece portions which directly face the third cutting lines, to make these ends have a larger thickness than other portions, thus enabling formation of cuff portions without turning-back the paper.

14. The insulating paper piece for electric motors according to claim 9, wherein the second cutting lines and the third cutting lines are provided on the same lines.

15. The insulating paper piece for electric motors according to claim 12, wherein the second cutting lines and the third cutting lines are provided on the same lines.

16. The insulating paper piece for electric motors according to claim 9, wherein the second cutting lines and the third cutting lines are arranged such that a spacing between the two second cutting lines is larger than a spacing between the two of the third cutting lines; and sixth cutting lines, are provided on extensions of the second cutting lines in parallel and directly facing the third cutting lines, and wherein by bending the portions interposed between the third cutting lines and the sixth cutting lines in the same direction that the inner piece portions are bent, an upright covering portion in the vicinity of boundary between the slot cell portion and the phase insulation portion can be formed to cover the coil ends of the single pole coil.

17. The insulating paper piece for electric motors according to claim 12, wherein the second cutting lines and the third cutting lines are arranged such that a spacing between the two second cutting lines is larger than a spacing between the two of the third cutting lines; and sixth cutting lines, are provided on extensions of the second cutting lines in parallel and directly facing the third cutting lines, and wherein by bending the portions interposed between the third cutting lines and the sixth cutting lines in the same direction that the inner piece portions are bent, an upright covering portion in the vicinity of boundary between the slot cell portion and the phase insulation portion can be formed to cover the coil ends of the single pole coil.

18. The insulating paper piece for electric motors according to claim 9, wherein the second cutting lines and the third cutting lines are arranged such that the spacing between the two second cutting lines is smaller than the spacing between two of the third cutting lines, and by bending portions which have their ends at the second cutting lines, so that the bending portions approach the transverse sides, underside covering portions covering a part of those portions of the coil ends of the single pole coil which directly face the stator core can be formed.

19. The insulating paper piece for electric motors according to claim 12, wherein the second cutting lines and the third cutting lines are arranged such that the spacing between the two second cutting lines is smaller than the spacing between two of the third cutting lines, and by bending portions which have their ends at the second cutting lines, so that the bending portions approach the transverse sides, underside covering portions covering a part of those portions of the coil ends of the single pole coil which directly face the stator core can be formed.

20. An electric motor of a distributed winding structure, comprising:
a plurality of single pole coils arranged on a stator core, the coil ends of the single pole coils which protrude from both end surfaces of the stator core arranged so that portions of coils of different phases overlap one another; and insulating paper pieces for electric motors, arranged on the stator core to heighten electrical insulation in areas where the single pole coils adjoin, wherein at least some of the insulating paper pieces for electric motors are insulating paper pieces for electric motors according to claim 1 and each insulating paper piece contains at least two slot cell portions arranged in two slots of the stator core, in which two portions of one single pole coil are inserted, and two phase insulation portions arranged to connect respective ends of the two slot cell portions to form loops and disposed to face directly against coil ends of the single pole coil; and the phase insulation portions are arranged between the adjacent ends of coils of different phases.

21. The insulating paper piece according to claim 1, further comprising cuff portions projecting from the slots of the stator core comprise sections of the insulating paper piece folded back toward an end surface of the stator core.

\* \* \* \* \*